(12) United States Patent
Zeng (10) Patent No.: US 7,973,859 B2
(45) Date of Patent: Jul. 5, 2011

(54) APPARATUS, NETWORK DEVICE AND METHOD FOR VIDEO/AUDIO DATA TRANSMISSION

(75) Inventor: Qingyu Zeng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1233 days.

(21) Appl. No.: 11/612,110

(22) Filed: Dec. 18, 2006

(65) Prior Publication Data

US 2007/0169156 A1    Jul. 19, 2007

(30) Foreign Application Priority Data

Jan. 18, 2006  (CN) .......................... 2006 1 0033169

(51) Int. Cl.
  *H04N 5/50*  (2006.01)
(52) U.S. Cl. ....................................................... 348/552
(58) Field of Classification Search .................. 348/552, 348/553, 725, 563–566, 569; 725/81, 82, 725/78
  See application file for complete search history.

(56) References Cited

U.S. PATENT DOCUMENTS

| | | | |
|---|---|---|---|
| 5,642,498 A | | 6/1997 | Kutner |
| 5,671,226 A * | | 9/1997 | Murakami et al. ............ 370/474 |
| 5,734,415 A * | | 3/1998 | Hwang ....................... 348/14.01 |
| 5,900,908 A * | | 5/1999 | Kirkland .......................... 348/62 |
| 6,067,126 A * | | 5/2000 | Alexander .................... 348/738 |
| 6,963,612 B2 * | | 11/2005 | Haddad .................... 375/240.25 |
| 7,071,944 B2 * | | 7/2006 | MacInnis et al. ............. 345/505 |
| 7,242,437 B2 * | | 7/2007 | Sullivan ........................ 348/500 |
| 7,453,829 B2 * | | 11/2008 | Pasha et al. ................... 370/261 |
| 2002/0154658 A1 | | 10/2002 | Song |
| 2004/0150748 A1 | | 8/2004 | Phillips et al. |
| 2005/0281417 A1 | | 12/2005 | Toprover |
| 2007/0055997 A1 * | | 3/2007 | Witwer .......................... 725/81 |

FOREIGN PATENT DOCUMENTS

| | | |
|---|---|---|
| CN | 2269035 Y | 11/1997 |
| CN | 1684504 A | 10/2005 |
| JP | 07-184174 A | 7/1995 |
| JP | 2005-151446 A | 6/2005 |
| JP | 2005-252774 A | 9/2005 |
| JP | 2005-269508 A | 9/2005 |
| WO | 2006/003852 A1 | 1/2006 |

OTHER PUBLICATIONS

European Search Report for European Patent Application No. 06804975.8 dated Nov. 3, 2009.

(Continued)

*Primary Examiner* — Paulos M Natnael (57) ABSTRACT

Embodiments of the present invention disclose an apparatus for transmitting video/audio data, including a receiving decoding module, configured to receive remote video/audio data and a stream media transmitted from an IP network, respectively decode the received remote video/audio data and the stream media, input the decoded video data to the video synchronization module, and input the decoded audio data to the mixer; a video synchronization module, configured to combine and a synchronize the received video data; a mixer, configured to mix the received audio data. Embodiments of the present invention also disclose a network device and a method for transmitting video/audio data. Through the technical scheme disclosed in the embodiments of the invention, a user terminal may make an audio/video call while watching a stream media program via the same display screen and speaker.

7 Claims, 7 Drawing Sheets

OTHER PUBLICATIONS

English translation of the Written Opinion of the International Searching Authority for International Application No. PCT/CN2006/002757, dated Feb. 22, 2007.

European Office Action for European Patent Application No. 06804975.8, dated Oct. 7, 2010.

Chinese Office Action for Chinese Patent Application No. 200680011737.7, dated Apr. 17, 2009, and partial English translation thereof.

Chinese Office Action for Chinese Patent Application No. 200610033169.2, dated Feb. 22, 2008, and partial English translation thereof.

* cited by examiner

APPARATUS, NETWORK DEVICE AND METHOD FOR VIDEO/AUDIO DATA TRANSMISSION

CROSS-REFERENCE TO RELATED APPLICATIONS

This application claims the benefit of Chinese Patent Application No. 200610033169.2 filed Jan. 18, 2006. The disclosure of the above application is incorporated herein by reference.

FIELD

The present disclosure relates to video/audio data transmission techniques, and particularly, to an apparatus, a network device and a method for video/audio data transmission.

BACKGROUND

The statements in this section merely provide background information related to the present disclosure and may not constitute prior art.

Figure 1:
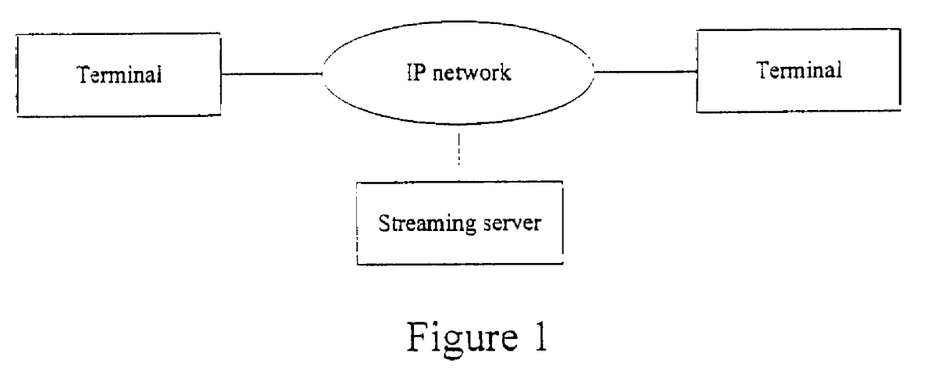
FIG. 1 is a schematic diagram illustrating an IP multimedia communication networking according to the related art.

Multimedia applications of IP network become well proved and more and more popular. A multimedia network integrates an audio transmission system and a video transmission system into a data transmission network. The multimedia network takes the IP network as a basic transmission network on which the audio and video transmission systems are built. This kind of network structure provides many multimedia applications such as voice call, video conference, IP Television (IPTV), electronic white board, etc. The networking of a multimedia network is generally as shown in FIG. 1. The user terminal is a tool for communication and Video on Demand (VoD) service used by a user, the user terminal may be a videophone, a set-top box, etc. All the streaming servers in FIG. 1 are various application servers for supporting video-conference, IPTV and other services.

Figure 2:
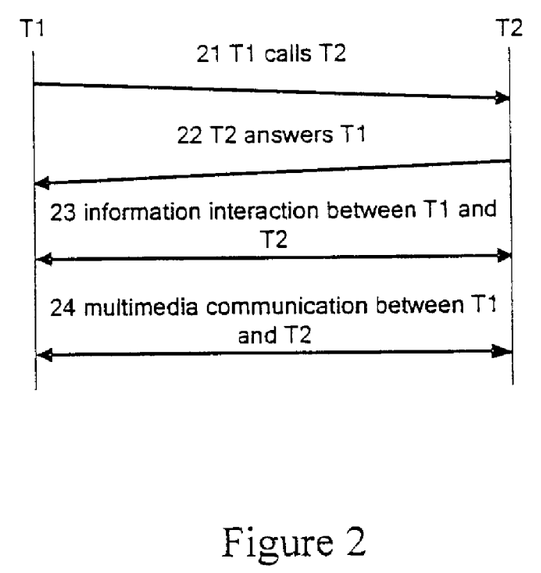
FIG. 2 is a schematic diagram of establishing an IP multimedia communication according to the related art.

In so many services of the multimedia network, a multimedia call service allows a user to make a call through a videophone. As shown in FIG. 2, the establishment of a multimedia call includes the following 4 steps:

Step 21, terminal T1 initiates a call;
Step 22, terminal T2, which is the called party, answers T1;
Step 23, T1 and T2 exchange device information with each other;
Step 24, the multimedia call is successfully established, T1 and T2 exchange multimedia data with each other.

During the multimedia communication, a video decoding module and an audio decoding module may respectively decode one channel of video data and one channel of audio data, and then send the decoded video data and audio data to a display screen and speaker to play. The structure of a video/audio receiving module is shown in FIG. 3.

Figure 3:
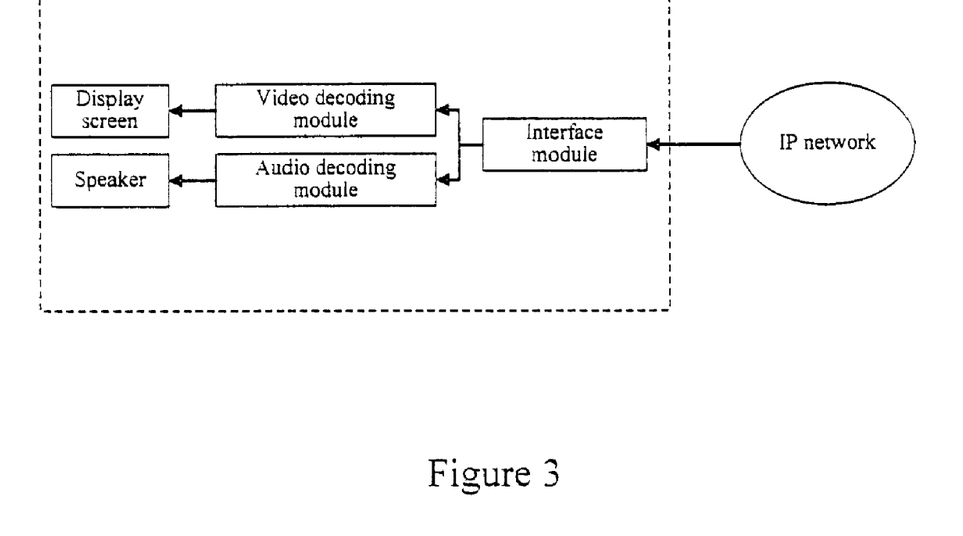
FIG. 3 is a block diagram illustrating a multimedia video/audio receiving module in a videophone according to the related art.
Figure 4:
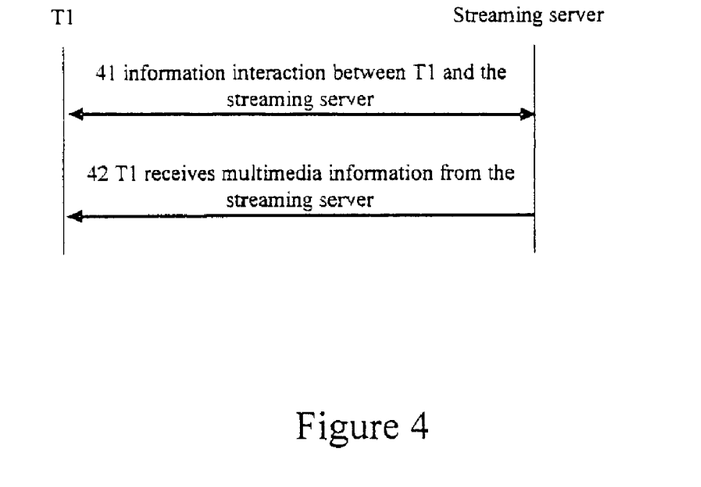
FIG. 4 is a schematic diagram of playing a stream media program via a videophone by a user according to the related art.

A user may watch a VoD program using T1 as shown in FIG. 3. A process of establishing a VoD service of T1 is as shown in FIG. 4, including the following two steps.

Step 41, T1 establishes a connection with a streaming server and exchanges VoD information with the streaming server;
Step 42, T1 receives video/audio data from the streaming server.

The solution of the related art can only decode one channel of video data and one channel of audio data at the same time. That is to say, a user cannot play a stream media when he is in a call. Moreover when the user is enjoying a VoD program, i.e., playing a stream media, he cannot answer an incoming call unless disconnecting the media stream.

SUMMARY

Embodiments of the present invention provide an apparatus, a network device and a method for video/audio data transmission, so as to solve the problem that a user cannot play a stream media and have a call at the same time using the same terminal.

An embodiment of the present invention provides an apparatus for video/audio data transmission, including:
a receiving decoding module, a video synchronization module and a mixer;
the receiving decoding module is configured to receive remote video/audio data and a stream media transmitted from an IP network, respectively decode the received remote video/audio data and the stream media, and input decoded video data to the video synchronization module, input decoded audio data to the mixer;
the video synchronization module is configured to combine and synchronize the received video data;
the mixer is configured to mix the received audio data.

A network device for video/audio data transmission includes:
a receiving decoding module, a video synchronization module, a mixer, a video encoding module, an audio encoding module and an interface module;
the receiving decoding module is configured to receive remote video/audio data and a stream media transmitted from an IP network, respectively decode the received remote video/audio data and the stream media, input decoded video data to the video synchronization module, and input decoded audio data to the mixer;
the video synchronization module is configured to combine and synchronize the received video data;
the mixer is configured to mix the received audio data;
the video encoding module receives the video data outputted from the video synchronization module;
the audio encoding module receives the audio data outputted from the mixer;
the video encoding module and the audio encoding module respectively send the outputted video data and audio data to a video terminal via the interface module.

An embodiment of the present invention still provides a method for video/audio data transmission, including:
combining and synchronizing remote video data and video data sent to a video terminal from a streaming server;
mixing remote audio data and audio data sent to the video terminal from the streaming server;
playing the resultant video/audio data to a user via the video terminal.

In an IP network, through the apparatus, network device and method for video/audio data transmission provided by the embodiments of the present invention, it is possible for a user terminal to hold an IP call when playing a stream media. During the call, a terminal screen may adopt a Picture In Picture (PIP) display mode or a Picture Out Picture (POP) display mode, and the user can simultaneously receive the audio data of the stream media and the remote audio data, so as to ensure the user to enjoy the stream media program while having an audio/video call.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In embodiments of the present invention, through performing a combination, a synchronization and an audio mixing operation for the video/audio data of a stream media sent to a video terminal by a video synchronization module and the remote video/audio data sent to the video terminal by an audio mixer, a user may watch and listen to a stream media program and have a call simultaneously.

The combination, synchronization and the audio mixing operations may be performed either at the terminal side or at a network side, which are hereinafter described through embodiments, respectively.

Figure 5:
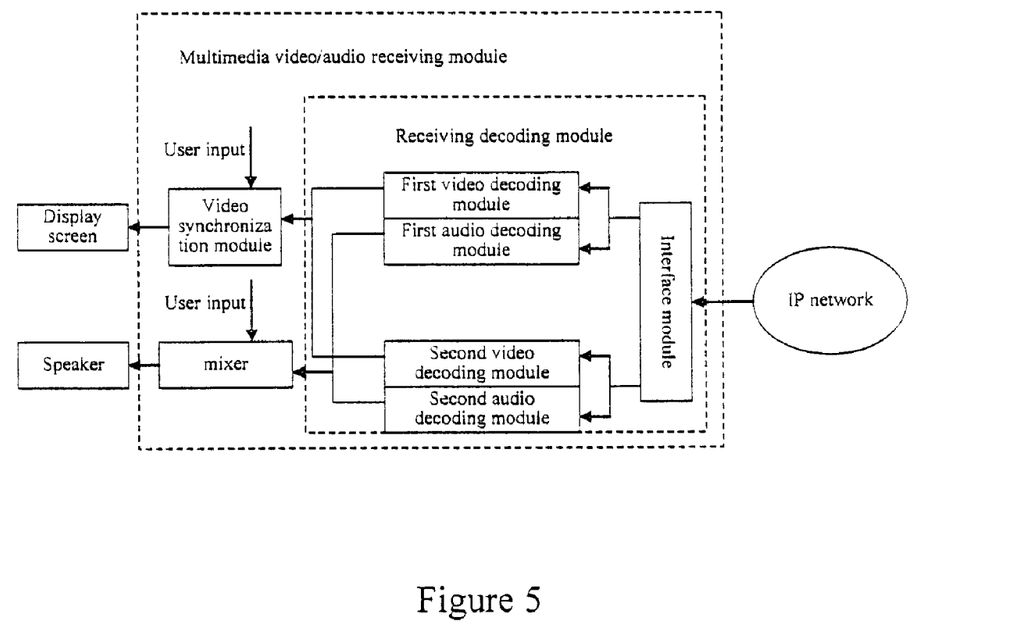
FIG. 5 is a block diagram illustrating a multimedia video/audio receiving module in the videophone according to a first embodiment of the present invention.

In a first embodiment of the present invention, the combination, synchronization and audio mixing operations are performed at the terminal side. Suppose that the video terminal is a videophone in this embodiment. A video/audio receiving module is set in the videophone. As shown in FIG. 5, the multimedia video/audio receiving module includes the following sub-modules:

a receiving decoding module, configured to receive remote video/audio data and a stream media transmitted from an IP network, and respectively decode the received remote video/audio data and the stream media, input two channels of decoded video data to the video synchronization module, input two channels of decoded audio data to the mixer;

a video synchronization module, configured to combine and synchronize the received two channels of video data;

a mixer, configured to mix the received two channels of audio data.

Specifically, the receiving decoding module may include:

an interface module, configured to transmit to corresponding decoding modules, respectively, the video/audio data collected by each port of the videophone from the IP network including remote video/audio data and a stream media. The interface module may include 4 ports: PORT01, PORT02, PORT03 and PORT04, they are respectively configured to receive the above mentioned video data of the stream media, the audio data of the stream media, the remote video data and the remote audio data;

a first video decoding module, configured to decode remote video data received from the interface module, and send the decoded video data to the video synchronization module;

a second video decoding module, configured to decode video data of a stream media received from the interface module, and send decoded the video data to the video synchronization module;

a first audio decoding module, configured to decode remote audio data received from the interface module, and send the decoded audio data to the mixer;

a second audio decoding module, configured to decode audio data of a stream media received from the interface module, and send the decoded audio data to the mixer.

The video synchronization module combines and synchronizes the video data from the first video decoding module and that from the second video decoding module, and outputs a playable video to the display screen.

Figure 6:
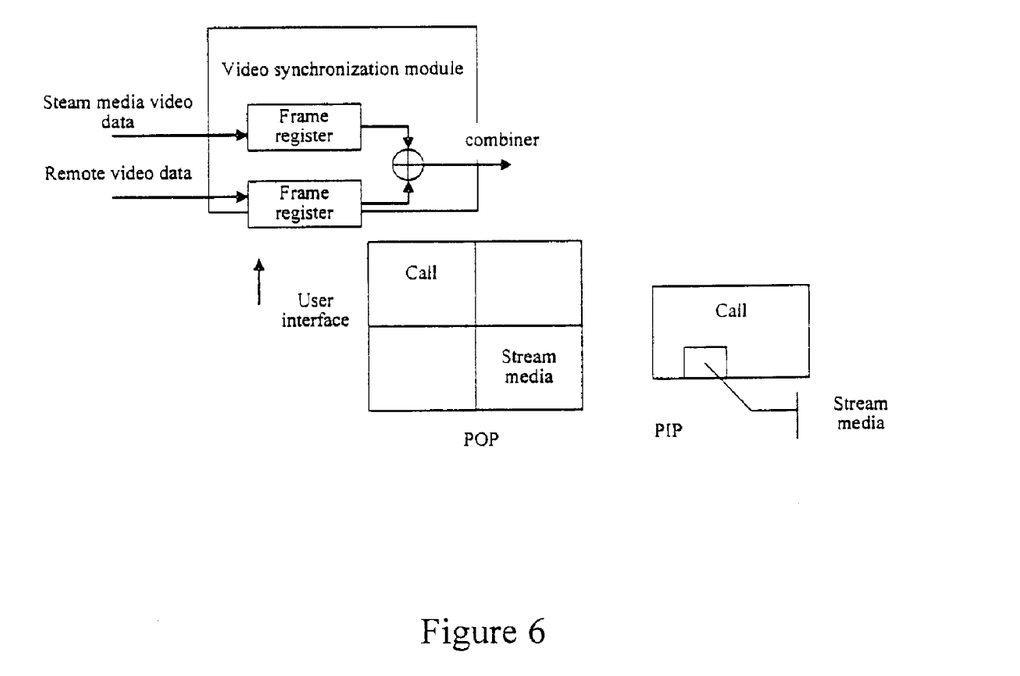
FIG. 6 is a schematic diagram illustrating a video synchronization module according to the first embodiment of the present invention.

A structure of a video synchronization module may be as shown in FIG. 6. The video synchronization module includes two video frame registers and a combiner. The two video frame registers are configured to store the remote video data received from the first video decoding module and the video data of the stream media from the second video decoding module. A refreshment of either of the video frame registers will lead to a combination of the video data in the two frame registers and an output of the combined data via the combiner. If no new data is sent into the frame registers, the frame registers keep the previous video data. Such a design may solve the problem that one channel of the video data may lack frame when the frame rates of the two channels of the video data are unequal. The combined video data from the combiner may be outputted to a display screen in a POP display mode or a PIP display mode to make the display screen simultaneously display the remote video data and the video data of the stream media from the streaming server. The user may, by sending an instruction to the combiner, control the output mode of the combiner, i.e., select either the POP display mode or the PIP display mode.

Meanwhile, the mixer mixes the two channels of audio data, including the audio data from the first audio decoding module and the audio data from the second audio decoding module, and outputs playable audio data to an audio player. Herein, the audio player is generally a speaker. The mixing ratio of each audio stream is selected by the user, i.e., the user may send an instruction to the mixer to control whether the voice of the call or that of the stream media will be louder or control that the voice of only one channel of audio data can be heard.

Figure 7:
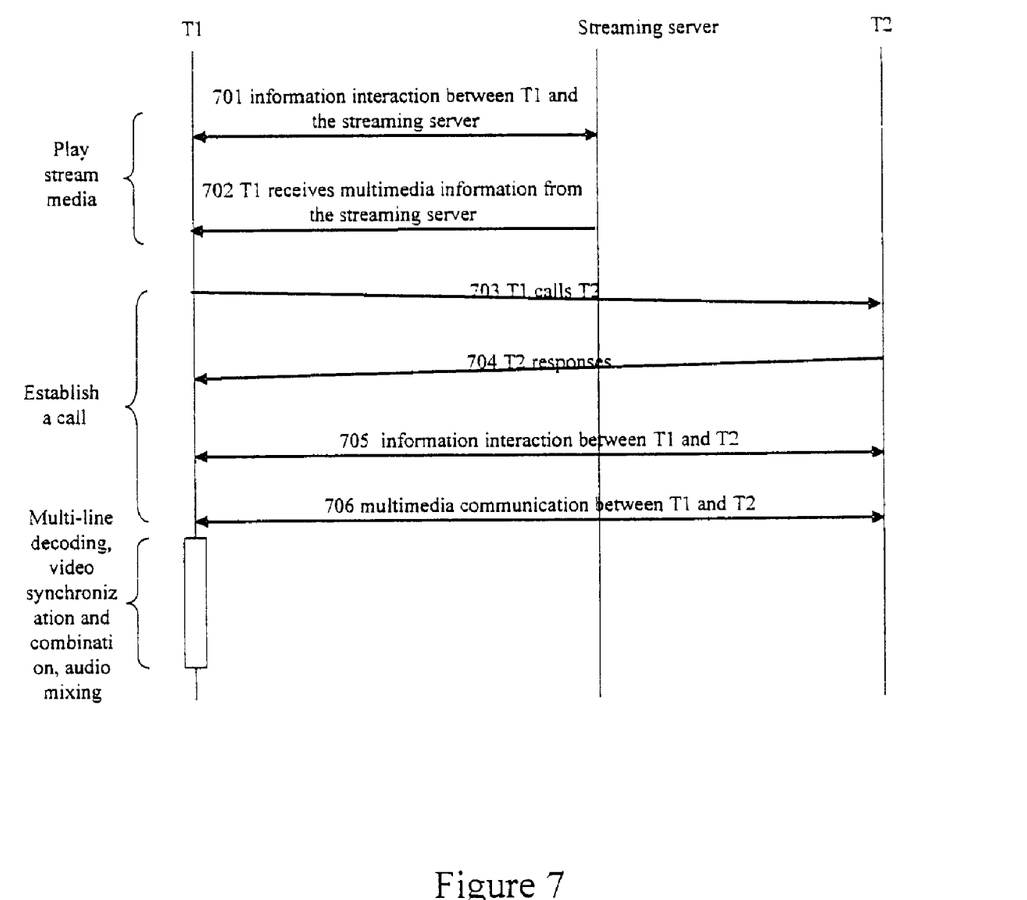
FIG. 7 is a schematic diagram of initiating a call while playing a stream media according to the first embodiment of the present invention.

FIG. 7 is a flowchart illustrating an initiation of a call while playing a stream media. T1 and T2 are two videophones. The process of T1 initiating a call to T2 while playing a media stream includes the following steps:

Step 701, T1 performs information interaction with the streaming server and establishes a connection with the streaming server, then T1 and the streaming server exchange VoD information;

Step 702, T1 receives multimedia information, i.e., video/audio data, from the streaming server, decodes and plays the multimedia information.

Specifically, T1 receives the video/audio data from the streaming server at the PORT01 and the PORT02 of its interface module. The interface module transmits the video/audio data received at the PORT01 to the second video decoding module and transmits the video/audio data received at the PORT02 to the second audio decoding module. The second video decoding module and the second audio decoding module start to work and respectively output displayable video data and playable audio data. The outputted video data and audio data are respectively sent to the video synchronization module and the mixer, and then sent into the display screen and the speaker in response to the selection of the user. At this time, T1 may select whether to play the video, and select whether to play the audio.

Step 703, T1 calls T2.

Step 704, T2 answers T1

Step 705, T1 and T2 perform information interaction, and exchange equipment information.

Step 706, when the call is put through, T1 and T2 perform a multimedia communication, and T1 receives video/audio data from T2.

Then, T1 performs a multi-line decoding, and then performs a video synchronization and combination, and an audio mixing, and plays the video/audio data.

Specifically, T1 receives the video/audio data from T2 at the PORT03 and the PORT04 of its interface module. The interface module transmits the video/audio data received at the PORT03 to the first video decoding module and transmits the video/audio data received at the PORT04 to the first audio decoding module. The first video decoding module and the first audio decoding module start to work and respectively output and send displayable video data and playable audio data to the video synchronization module and the mixer.

The video data sent to the video synchronization module includes two channels of video data: the video data from the streaming server and the video data from T2. The two channels of video data are combined and synchronized by the video synchronization module and sent to the display screen. The audio data sent to the mixer includes two channels of audio data: the audio data from the streaming server and the audio data from T2. The two channels of audio data are mixed by the mixer and then sent to the speaker. Herein, the combination mode of the video synchronization module may be a default mode selected by T1. Similarly, the audio mixing mode of the mixer may also be a default mode selected by T1.

In addition, during a call, T1 may configure the operation modes of the video synchronization module and the mixer through a user interface, i.e., T1 may send a video synchronization instruction to the video synchronization module or send a mixing mode instruction to the mixer. Then the video synchronization module and the mixer can determine their respective operation mode according to the received instruction.

When T1 hangs up after a call, the first video decoding module and the first audio decoding module stop working, T1 plays only the video/audio data from the streaming server. If T1 closes the stream media, the second video decoding module and the second audio decoding module also stop working, and T1 stops playing the video/audio data from the streaming server. After that, the user may close the display screen and the speaker.

T1 may also close the stream media first, thus T1 plays only the video/audio data from T2. Then T1 stops playing the video/audio data from T2 when the call is over.

The process of the user playing a stream media during a call is similar to the above steps, which will not be repeated here.

Figure 8:
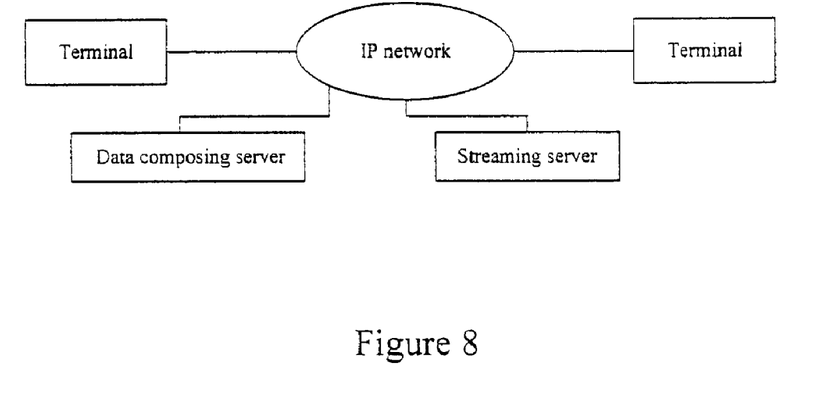
FIG. 8 is a schematic diagram illustrating a networking of a data composing server scheme according to a second embodiment of the present invention.

A system networking according to a second embodiment of the present invention is as shown in FIG. 8. Different from that of FIG. 1, a data composing server is added to FIG. 8. When a user terminal cannot afford more than one video/audio decoding module but only one video decoding module and one audio decoding module, an alternative is to add a decoding device, i.e., a data composing server, at the network side. When there is a stream media and a call simultaneously, by a media re-directing function, it is possible to send the stream media of the streaming server and the remote video/audio data to the data composing server. The data composing server performs such operations as multi-line decoding, video combination and audio mixing. Then the data composing server respectively transmits one channel of video data and one channel of audio data to the user terminal. The user terminal in this embodiment adopts a structure as shown in FIG. 3. In this way, the objective of playing a stream media and making a video call simultaneously may also be achieved.

Figure 9:
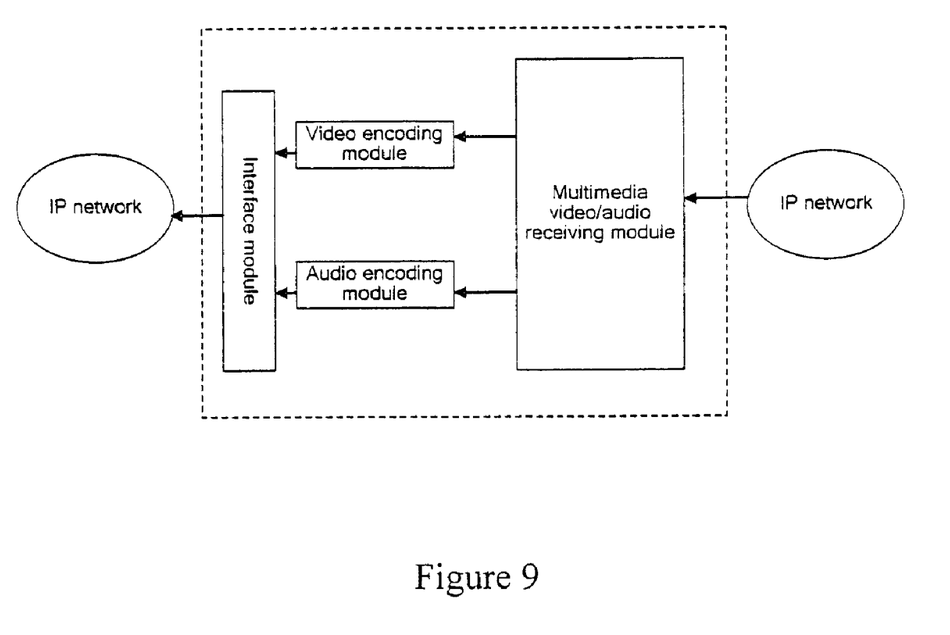
FIG. 9 is a schematic diagram illustrating a structure of the data composing server according to the second embodiment of the present invention.
Figure 10:
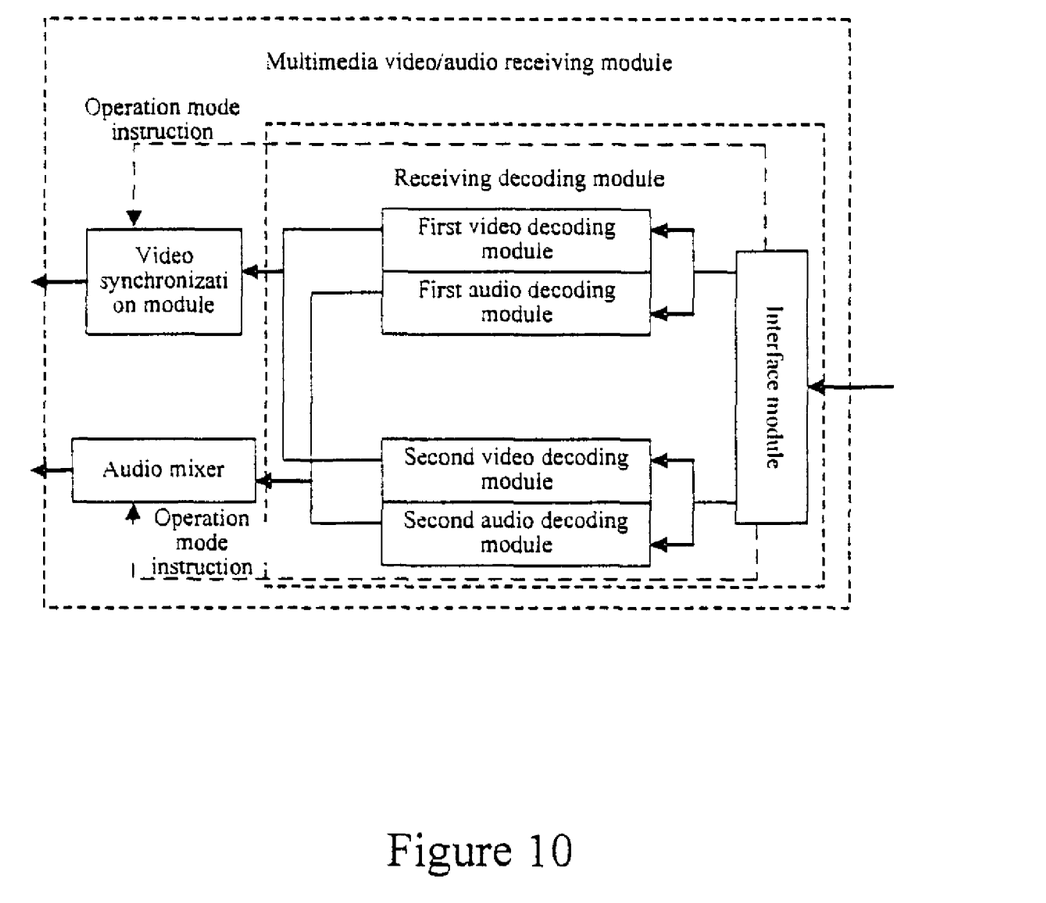
FIG. 10 is a schematic diagram illustrating a structure of a video/audio processing module according to the second embodiment of the present invention.

A structure of the data composing server is as shown in FIG. 9, including a multimedia video/audio receiving module, a video encoding module, an audio encoding module and an interface module. The structure of the multimedia video/audio receiving module is as shown in FIG. 10, which includes an interface module, a first video decoding module, a second video decoding module, a first audio decoding module, a second audio decoding module, a video synchronization module and a mixer. The function of the interface module is basically the same as that in the first embodiment, and the functions of other modules have been described in detail in the first embodiment. In FIG. 9, the video data from the video synchronization module is outputted to the video encoding module, encoded by the video encoding module and then sent to the interface module. The audio data from the mixer is outputted to the audio encoding module, encoded by the audio encoding module and then sent to the interface module.

Figure 11:
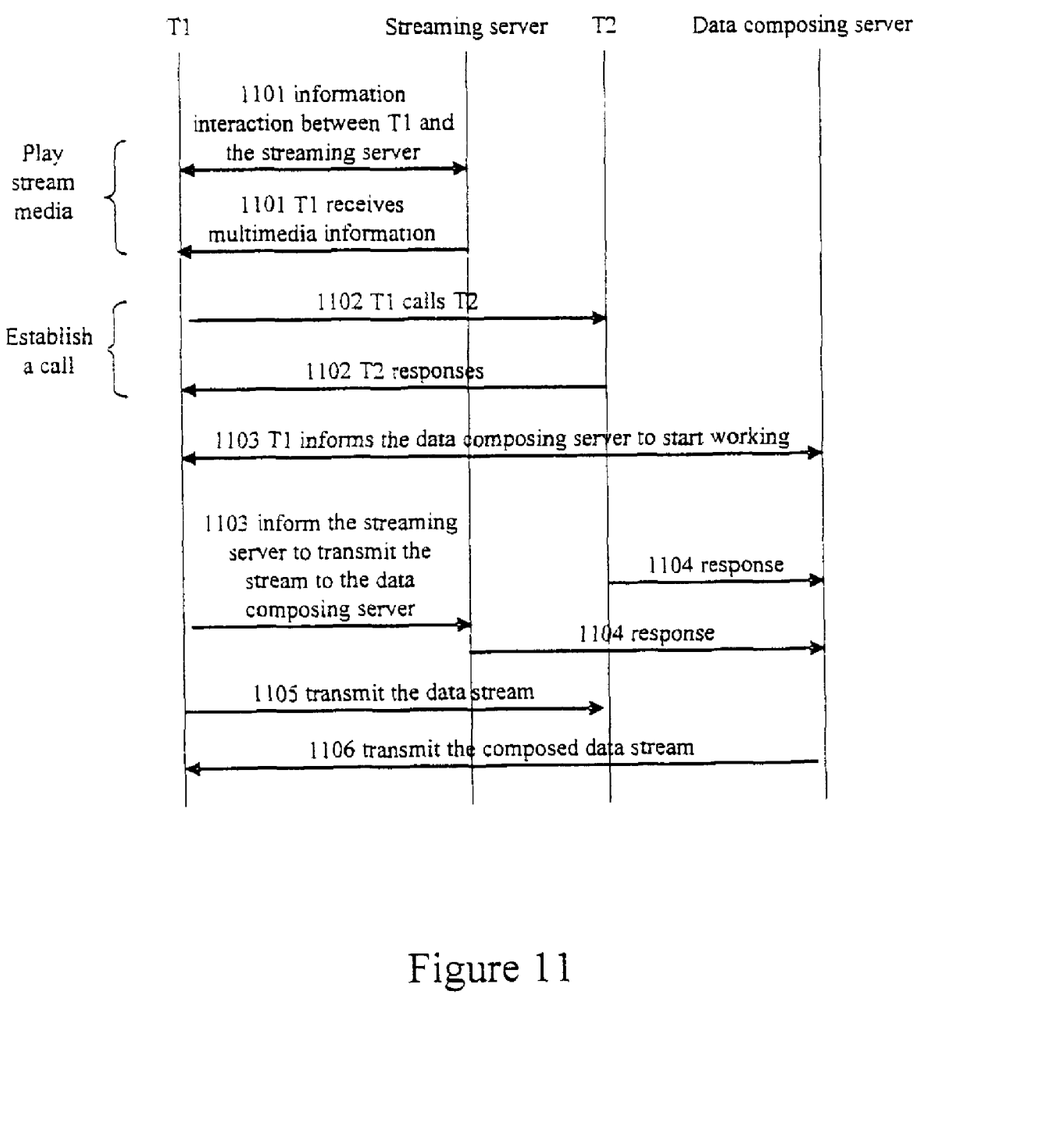
FIG. 11 is a flowchart diagram of initiating a call while playing a stream media by a user terminal according to the second embodiment of the present invention.

The process of initiating a call by the user terminal when playing a stream media in this embodiment is shown in FIG. 11, including the following steps:

Step 1101, the videophone T1 normally communicates with the streaming server, and successfully plays a stream media.

Step 1102, T1 initiates a call to the videophone T2, and simultaneously instructs T2 to send the video/audio data to the data composing server.

Step 1103, T1 informs the data composing server to start working, and informs the streaming server to send the video/audio data to the data composing server.

The T1 may submit the operation modes of the video synchronization module and the mixer selected by the user to the data composing server. After receiving the operation modes of the video synchronization module and the mixer, the interface module in the data composing server sends corresponding control data to the video synchronization module and the mixer so as to combine and synchronize the video data and perform the mixing operation for the audio data.

Step 1104, the data composing server starts receiving the video/audio data from T2 and from the streaming server.

In this embodiment, the working process of the data composing server includes: after receiving a start command, starting working to get ready to receive video/audio data; when receiving video/audio data from the user terminal and the streaming server, outputting playable video/audio data to the video encoding module and the audio encoding module after the video/audio data are processed by the multimedia video/audio receiving module; the video encoding module and the audio encoding module encode the received video/audio data, and send the encoded video/audio data to the user terminal through the interface module.

Step 1105, T1 sends the video/audio data of its own side to T2.

Step 1106, T1 receives the video/audio data from the data composing server, displays and plays the video/audio data.

The process of playing a stream media during a call is similar to the above steps, which will not be repeated here.

The foregoing is only the preferred embodiments of the present invention, and is not for use in limiting the present invention. Any modification, equivalent replacement or improvement made under the spirit and principles of this invention should be covered within the protection scope of this invention.

What is claimed is:

1. An apparatus for video/audio data transmission, comprising:
   a receiving decoding module, a video synchronization module and a mixer; wherein
   the receiving decoding module is configured to receive remote video/audio data and a stream media transmitted from an IP network, respectively decode the received remote video/audio data and the stream media, input decoded video data to the video synchronization module, and input decoded audio data to the mixer;
   the video synchronization module is configured to combine and synchronize the received video data;
   the mixer is configured to mix the received audio data; and
   the video synchronization module comprises two video frame registers respectively configured to store the video data of the stream media and the remote video data; if any one of the frame registers is refreshed, a combination and an output are made; and if no new data is inputted into the video frame registers, the video frame registers keep the previous video data.

2. The apparatus of claim 1, wherein the receiving decoding module comprises an interface module, a first video decoding module, a second video decoding module, a first audio decoding module and a second audio decoding module; wherein the interface module is configured to transmit the remote video/audio data and the stream media from the IP network to corresponding decoding modules;
   the first video decoding module is configured to decode the remote video data received from the interface module, and send the decoded video data to the video synchronization module;
   the second video decoding module is configured to decode the video data of the stream media received from the interface module, and send the decoded video data to the video synchronization module;
   the first audio decoding module is configured to decode the remote audio data received from the interface module, and send the decoded audio data to the mixer;
   the second audio decoding module is configured to decode the audio data of the stream media received from the interface module, and send the decoded audio data to the mixer.

3. A network device for video/audio data transmission, comprising:
   a receiving decoding module, a video synchronization module, a mixer, a video encoding module, an audio encoding module and an interface module; wherein
   the receiving decoding module is configured to receive remote video/audio data and a stream media transmitted from an IP network, respectively decode the received remote video/audio data and the stream media, input decoded video data to the video synchronization module, and input decoded audio data to the mixer;
   the video synchronization module is configured to combine and synchronize the received video data;
   the mixer is configured to mix the received audio data;
   the video encoding module is configured to receive the video data outputted from the video synchronization module and send the outputted video data to a video terminal via the interface module;
   the audio encoding module is configured to receive the audio data outputted from the mixer and send the outputted video data to the video terminal via the interface module; and
   the video synchronization module comprises two video frame registers respectively configured to store the video data of the stream media and remote the video data; if any one of the frame registers is refreshed, a combination and an output are made; and if no new data is inputted into the video frame registers, the video frame registers keep the previous video data.

4. The network device of claim 3, wherein the receiving decoding module comprises:
   an interface module, a first video decoding module, a second video decoding module, a first audio decoding module, a second audio decoding module;
   the interface module is configured to transmit remote video/audio data and a stream media from an IP network to corresponding decoding modules;
   the first video decoding module is configured to decode remote video data received from the interface module, and send the decoded video data to the video synchronization module;
   the second video decoding module is configured to decode video data of a stream media received from the interface module, and send decoded the video data to the video synchronization module;
   the first audio decoding module is configured to decode the remote audio data received from the interface module, and send the decoded audio data to the mixer;
   the second audio decoding module is configured to decode audio data of a stream media received from the interface module, and send the decoded audio data to the mixer.

5. A method for video/audio data transmission, comprising combining and synchronizing remote video data and video data sent to the video terminal from a streaming server;
   mixing remote audio data and audio data sent to the video terminal from a streaming server;
   playing the resultant video/audio data to a user via the video terminal;
   wherein, the steps of combining and synchronizing remote video data and video data sent to the video terminal from a streaming server and mixing remote audio data and audio data sent to the video terminal from a streaming server comprise:
   informing, by the video terminal in a call, the remote side of the call to send the remote video/audio data to a data composing server configured at a network side;

informing, by the video terminal in the call, the streaming server to send the video/audio data sent to the video terminal to the data composing server;

receiving, by the data composing server, the remote video/audio data and the video/audio data from the streaming server;

combining and a synchronizing, by the data composing server, the received two channels of video data and mixing the received two channels of audio data;

the step of playing the resultant video/audio data to a user via the video terminal comprising:

encoding, by the data composing server, the combined and synchronized video data and the mixed audio data respectively;

sending the resultant video/audio data to the video terminal;

playing, by the video terminal, the received video data and the audio data to the user.

6. The method of claim 5, further comprising:

sending, by a user, an operation mode instruction to the video terminal;

determining, by the video terminal, an operation mode according to the received operation mode instruction.

7. The method of claim 5, further comprising:

sending, by the user, an operation mode instruction to the data composing server through the video terminal;

determining, by the data composing server, an operation mode according to the received operation mode instruction.

* * * * *